(12) United States Patent
Zhang et al.

(10) Patent No.: US 11,709,098 B2
(45) Date of Patent: Jul. 25, 2023

(54) DEVICE AND METHOD FOR DETECTING ENERGY BEAM

(71) Applicants: Tsinghua University, Beijing (CN); HON HAI PRECISION INDUSTRY CO., LTD., New Taipei (TW)

(72) Inventors: Ke Zhang, Beijing (CN); Guo Chen, Beijing (CN); Peng Liu, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 180 days.

(21) Appl. No.: 17/381,544

(22) Filed: Jul. 21, 2021

(65) Prior Publication Data
US 2022/0404205 A1 Dec. 22, 2022

(30) Foreign Application Priority Data
Jun. 16, 2021 (CN) .......................... 202110665783.5

(51) Int. Cl.
G01J 5/02 (2022.01)
G01J 5/20 (2006.01)
H04N 5/33 (2023.01)

(52) U.S. Cl.
CPC ................ *G01J 5/023* (2013.01); *G01J 5/20* (2013.01); *H04N 5/33* (2013.01)

(58) Field of Classification Search
CPC .. G01J 5/023; G01J 5/20; G01J 1/0459; G01J 1/4257; H04N 5/33; H01J 2237/24507; G01T 1/29
See application file for complete search history.

(56) References Cited

U.S. PATENT DOCUMENTS

| 7,608,824 | B2 | 10/2009 | Korsah et al. | |
| 2013/0329220 | A1 | 12/2013 | Jiang | |
| 2015/0364691 | A1* | 12/2015 | Wang | H10K 39/30 257/29 |

FOREIGN PATENT DOCUMENTS

| CN | 104071742 | 10/2014 |
| JP | 2014-219199 | 11/2014 |

* cited by examiner

*Primary Examiner* — David P Porta
*Assistant Examiner* — Meenakshi S Sahu
(74) *Attorney, Agent, or Firm* — ScienBiziP, P.C.

(57) ABSTRACT

A device for detecting energy beam is provided. The device comprises a carbon nanotube structure, a support structure and an infrared detector. The carbon nanotube structure comprises a plurality of carbon nanotubes, and an extending direction of each carbon nanotube is parallel to a direction of an energy beam to be detected. The support structure is configured to support the carbon nanotube structure, and make a portion of the carbon nanotube structure suspended in the air. The infrared detector is located below and spaced apart from the carbon nanotube structure. The infrared detector is configured to detect a temperature of a suspended portion of the carbon nanotube structure, and image according to a temperature distribution of the carbon nanotube structure. A method for detecting energy beam is also provided.

19 Claims, 13 Drawing Sheets

DEVICE AND METHOD FOR DETECTING ENERGY BEAM

CROSS-REFERENCE TO RELATED APPLICATIONS

This application claims all benefits accruing under 35 U.S.C. § 119 from China Patent Application No. 202110665783.5, filed on Jun. 16, 2021, in the China Intellectual Property Office, the contents of which are hereby incorporated by reference.

FIELD

The present disclosure relates to device and method for detecting energy beam, especially relates to device and method for detecting energy beam using a carbon nanotube structure.

BACKGROUND

Conventional devices and methods for detecting energy beam can accurately detect low-energy beams, but cannot accurately detect high-energy beams. For example, low-energy electron beams are generally detected by a fluorescent screen, a basic principle is that when electrons hit a fluorescent material, fluorescence can be emitted, and a position and an appearance of the electron beam can be obtained by the fluorescence. However, heat generated by a high-energy beam is relatively large, and the thermal energy may destroy the fluorescent material and the conventional method and device are unusable.

What is needed, therefore, is to provide a detection device and detection method that can accurately detect high-energy beams.

BRIEF DESCRIPTION OF THE DRAWINGS

Implementations of the present technology will now be described, by way of example only, with reference to the attached figures, wherein.

DETAILED DESCRIPTION

Figure 1:
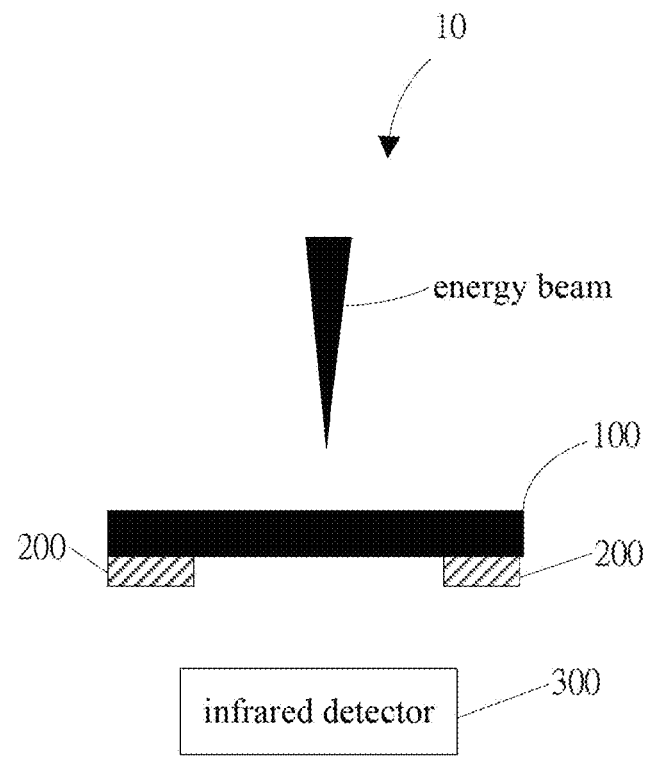
FIG. 1 is a structure schematic diagram of one embodiment of a device for detecting energy beam according to the present disclosure.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Referring to FIG. 1, a device 10 for detecting energy beam according one embodiment is provided. The device 10 comprises a carbon nanotube structure 100, a support structure 200, and an infrared detector 300. The carbon nanotube structure 100 is located on a surface of the support structure 200 and is suspended between the support structure 200. The infrared detector 300 is on one side of a suspended portion of the carbon nanotube structure 100 and spaced apart from the carbon nanotube structure 100. An entrance of the energy beam is defined as above the carbon nanotube structure 10. In one embodiment, the infrared detector 300 is located below the carbon nanotube structure 100 and spaced apart from the carbon nanotube structure 100.

Figure 2:
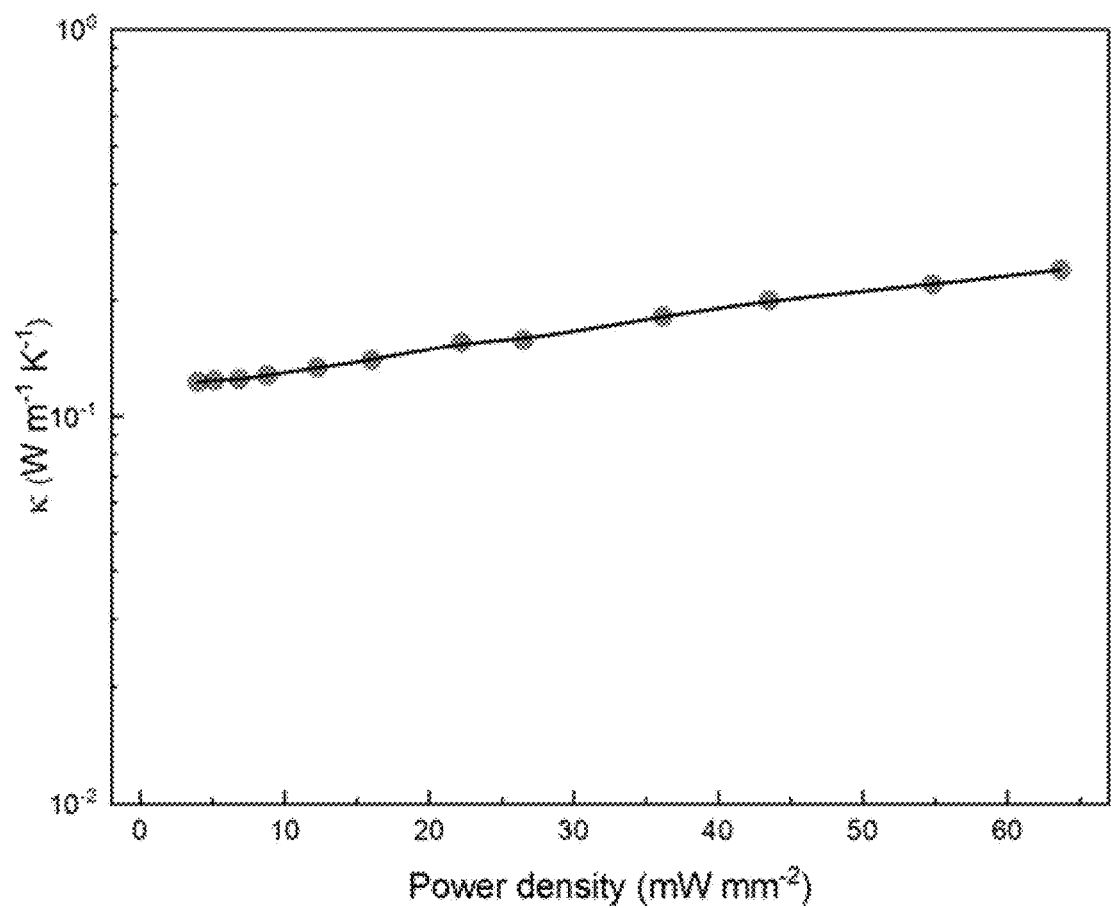
FIG. 2 is a change curve of one embodiment of a transverse thermal conductivity of a carbon nanotube with an energy density of an energy beam according to the present disclosure.

The carbon nanotube structure 100 comprises a plurality of carbon nanotubes 102. An extending direction of the plurality of carbon nanotubes 102 is substantially parallel to each other, and the extending direction is parallel to a direction of the energy beam. The extending direction of each carbon nanotube is substantially perpendicular to the substrate structure. The plurality of carbon nanotubes 102 are joined together by van der Waals force to form an integral structure. When the energy beam bombards a surface of the carbon nanotube structure 100, a heat is generated in the carbon nanotube structure 100. A thermal conductivity of carbon nanotubes in a transverse direction (perpendicular to a length of the carbon nanotubes) is very poor, referring to FIG. 2, under different energy densities, the thermal conductivity of carbon nanotubes in the transverse direction is between 0.1~0.2 $Wm^{-1}K^{-1}$. When the energy beam irradiates on the carbon nanotube structure 100, the heat generated by the energy beam dissipates very slowly in the carbon nanotube structure 100. The carbon nanotube structure 100 comprises a first portion and a second portion, the first portion is irradiated by the energy beam, and the second portion is not irradiated by the energy beam. Therefore, when the energy beam irradiates on the carbon nanotube structure 100, a temperature of the first portion increases, and a temperature of the second portion is substantially unchanged; and a beam spot size of the energy beam can be obtained by the infrared detector 300 according to a temperature distribution in the carbon nanotube structure 100. When the energy beam moves above the carbon nanotube structure 100, a movement trajectory of the energy beam can be obtained by the infrared detector 300 according to the temperature distribution in the carbon nanotube structure 100. A thermal conductivity of carbon nanotubes in an axial direction (length direction of the carbon nanotubes) is large, since the carbon nanotube structure 100 is suspended on the surface of the support structure 200, the heat of the carbon nanotube structure 100 in the axial direction can be instantly transferred to the air and dispersed. Therefore, the thermal conductivity of carbon nanotubes in the axial direction does not affect the heat conduction of the carbon nanotubes in the transverse direction, and further improve the detection accuracy of the device 10. In one embodiment, the energy beam irradiates on the surface of the carbon nanotube structure 100 in a vertical direction, and the plurality of carbon nanotubes 102 in the carbon nanotube structure 100 are arranged vertically and perpendicular to the surface of the support structure 200.

The carbon nanotube structure 100 is a free-standing structure. The term 'free-standing' means that the carbon nanotube structure 100 does not need to be supported by a large area of support; and the carbon nanotube structure 100 can be suspended and maintain its overall state, as long as two opposite sides of the carbon nanotube structure 100 are provided with support. A portion of the carbon nanotube structure 100 that is not contacted with the support structure 200 is defined as a suspended portion. A maximum diameter of the suspended portion of the carbon nanotube structure 100 is selected according to a size of the energy beam. The maximum diameter of the suspended portion of the carbon nanotube structure 100 is greater than a maximum diameter of the energy beam. In one embodiment, the maximum diameter of the suspended portion of the carbon nanotube structure 100 is more than 1.5 times of the maximum diameter of the energy beam. In one embodiment, the maximum diameter of the suspended portion of the carbon nanotube structure 100 is 1.5 to 3 times of the maximum diameter of the energy beam. The diameter of the suspended portion of the carbon nanotube structure 100 is too large, such as greater than 3 times of the maximum diameter of the energy beam, the suspended portion of the carbon nanotube structure is easily damaged and waste cost. On the contrary, the diameter of the suspended portion of the carbon nanotube structure 100 is too small, such as smaller than 1.5 times of the maximum diameter of the energy beam, the energy beam can not be fully detected, which affects the detection accuracy.

Figure 3:
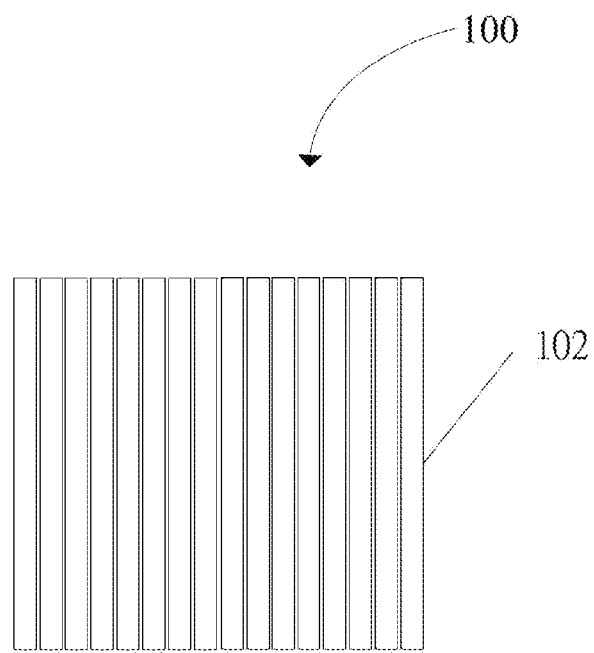
FIG. 3 is a structure schematic diagram of one embodiment of a carbon nanotube structure according to the present disclosure.
Figure 4:
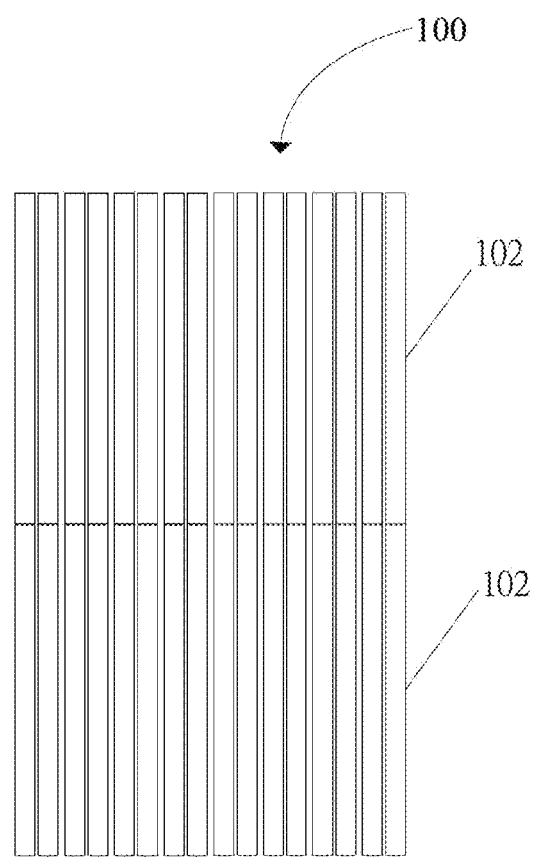
FIG. 4 is a structure schematic diagram of another embodiment of a carbon nanotube structure according to the present disclosure.
Figure 5:
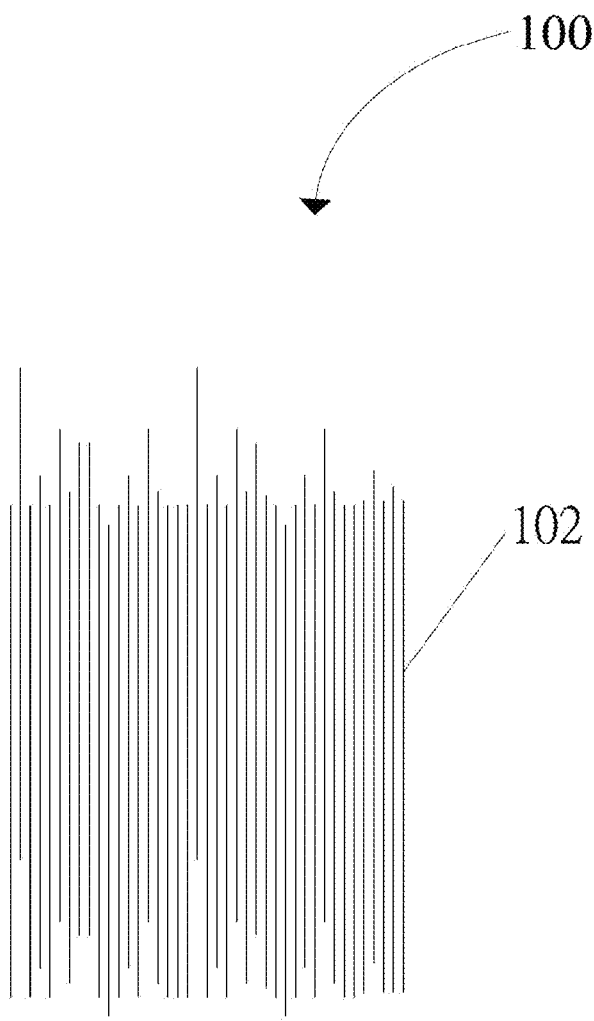
FIG. 5 is a structure schematic diagram of another embodiment of a carbon nanotube structure.

In one embodiment, referring to FIG. 3, there is only one carbon nanotube 102 in the extending direction of each carbon nanotube of the plurality of carbon nanotubes 102; and the carbon nanotube structure 100 can be a carbon nanotube array. In one embodiment, referring to FIG. 4, there are a plurality of carbon nanotubes joined with each other in the extending direction of each carbon nanotube of the plurality of carbon nanotubes 102; and the carbon nanotube structure 100 can be an integral structure formed by a plurality of carbon nanotube arrays stacked with each other. In another embodiment, referring to FIG. 5, the plurality of carbon nanotubes 102 are staggered arranged in a direction parallel to the extending direction of the plurality of carbon nanotubes 102.

In one embodiment, the carbon nanotube structure 100 is a super-aligned carbon nanotube array. In one embodiment, the carbon nanotube structure 100 comprises a plurality of super-aligned carbon nanotube arrays stacked with each other. The super-aligned carbon nanotube array comprises a plurality of carbon nanotubes parallel to each other and extending to a same direction. The plurality of carbon nanotubes of the super-aligned carbon nanotube array are joined together through van der Waals forces to form an array. A size, a thickness, and a surface area of the super-aligned carbon nanotube array can be selected according to actual needs. Examples of a method of making the super-aligned carbon nanotube array is taught by U.S. Pat. No. 8,048,256 to Feng et al. The carbon nanotube array is not limited to the super-aligned carbon nanotube array, and can also be other carbon nanotube arrays.

A thickness of the carbon nanotube structure 100 in the extending direction of the plurality of carbon nanotubes is selected according to actual needs. In one embodiment, the thickness of the carbon nanotube structure 100 in the extending direction ranges from 200 micrometers to 400 micrometers.

The support structure 200 is used to support the carbon nanotube structure 100, and make a portion of the carbon nanotube structure 100 suspended in the air. In one embodiment, the support structure 200 only contacts edge positions of the carbon nanotube structure 100, that is, the carbon nanotube structure 100 is supported by the support structure 200 at edge points of the carbon nanotube structure 100. For example, the support structure 200 can be a hollow frame, or a plurality of columns arranged at intervals. In one embodiment, a material of the support structure 200 is a heat insulating material; the heat insulating material can prevent the support structure 200 from absorbing the heat in the carbon nanotube structure 100 and affect the detection accuracy. For example, the material of the support structure 200 can be glass, plastic, silicon wafer, silicon dioxide wafer, quartz wafer, polymethylmethacrylate (PMMA), polyethylene terephthalate (PET), silicon, silicon with an oxide layer, or quartz. In one embodiment, the support structure 200 is a hollow frame.

Figure 6:
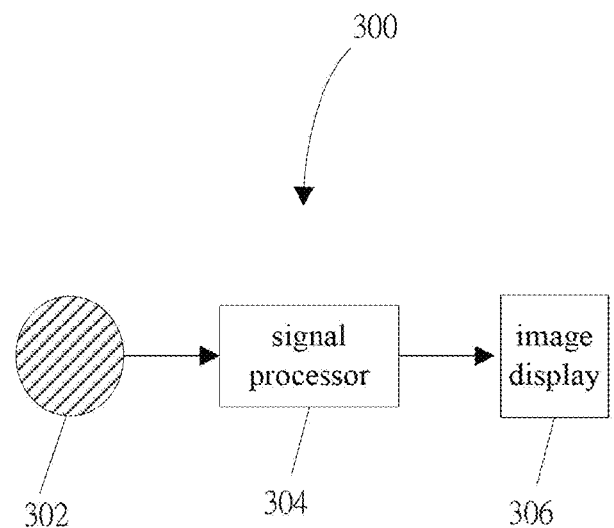
FIG. 6 is a structure schematic diagram of one embodiment of an infrared detector according to the present disclosure.

The infrared detector 300 is used to detect a temperature of the suspended portion of the carbon nanotube structure, to obtain a temperature distribution of the carbon nanotube structure; and produce an image according to the temperature distribution of the carbon nanotube structure. Referring to FIG. 6, the infrared detector 300 comprises an infrared probe 302, a signal processor 304, and an image display 306.

The temperature distribution of the carbon nanotube structure 100 is different, so an infrared radiation distribution at different positions of the carbon nanotube structure 100 is also different. The infrared heat radiation in the carbon nanotube structure 100 is converted into electrical signals by the infrared detector 300, and then the electrical signals are amplified and image processed, to obtain an image that can be observed by the naked eye. Specifically, the infrared probe 302 detects the infrared heat radiation in the carbon nanotube structure 100 and forms the electrical signals; the electrical signal is processed by the signal processor 304 and then imaged to form an image; and the image is displayed on the image display 306. An image formed by the infrared detector 300 can reflect the temperature distribution state on the surface of the carbon nanotube structure 100; therefore, a beam spot and a movement track of the energy beam irradiated on the surface of the carbon nanotube structure 100 can be obtained according to the image formed by the infrared detector 300.

A type of the infrared detector 300 is not limited, as long as it can image according to the temperature distribution of the carbon nanotube structure 100. In one embodiment, the infrared detector 300 is an infrared thermal imager.

The device 10 can be used to detect any energy beam capable of generating heat, such as electron beams, light beams, and the like.

A method for detecting energy beam using the device 10 according to one embodiment is provided. The method comprises steps of:

step S1, providing the device 10;

step S2, placing the suspended portion of the carbon nanotube structure 100 on a projectile of an energy beam to be measured and generating heat, and the heat changing the temperature distribution of the carbon nanotube structure 100; and step S3, the infrared detector 300 producing an image according to the temperature distribution of the carbon nanotube structure 100, thereby obtaining a beam spot image or a movement track of the energy beam to be measured.

In step S2, the energy beam to be measured irradiates to the surface of the suspended portion of the carbon nanotube structure 100.

Figure 7:
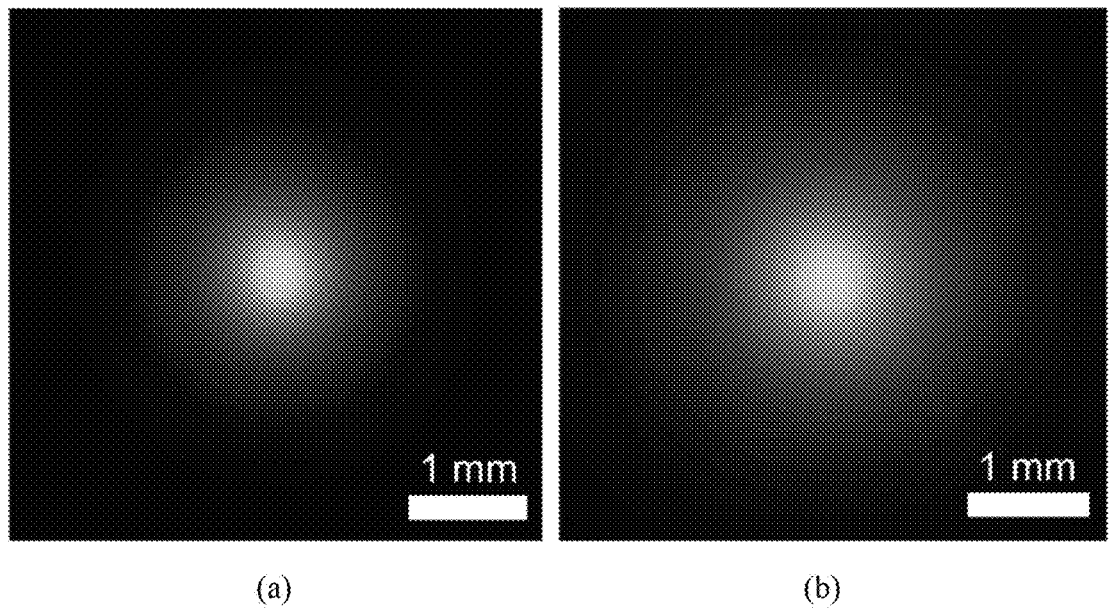
FIG. 7 is a shape of an electron beam spot detected by the device in FIG. 1 and a theoretical calculation diagram of the electron beam spot.
Figure 8:
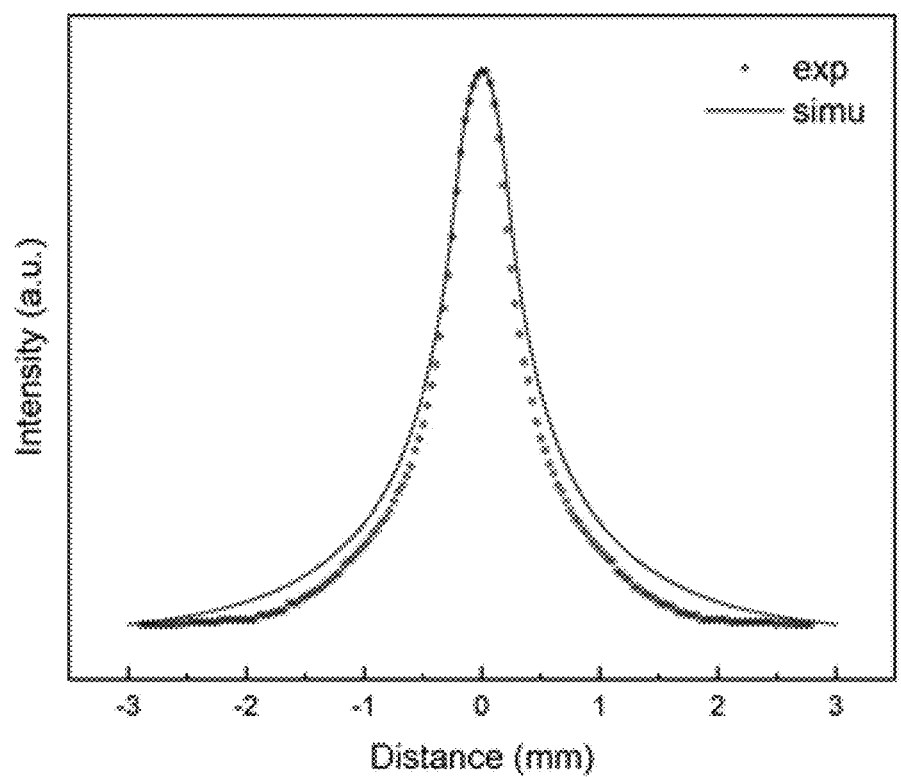
FIG. 8 is a change curve of different positions of the carbon nanotube structure with a current intensity when the device in FIG. 1 is used to detect an electron beam.

Referring to FIG. 7, FIG. 7a is the shape and size of an electron beam spot detected by the device 10 of one embodiment, and FIG. 7b is a theoretical calculation diagram of the electron beam spot. It can be seen from FIG. 7 that the shape and size of the electron beam spot obtained by the device 10 are substantially consistent with the shape and size of the beam spot calculated by the electron beam theory. FIG. 8 is a curve showing a relationship between a current intensity in the infrared detector 300 and a position in the carbon nanotube structure 100 when the device 10 is used to detect an electron beam. A point with the highest current intensity in the curve is a center of the electron beam. A distance between a position where the current intensity starts to increase and a position where the current intensity no longer decreases is the maximum diameter of the electron beam. It can also be seen from FIG. 8 that the curve of the electron beam obtained by the device 10 is substantially consistent with the theoretical curve. FIG. 7 and FIG. 8 illustrate that the device 10 has a high accuracy when detecting the electron beam spot.

Figure 9:
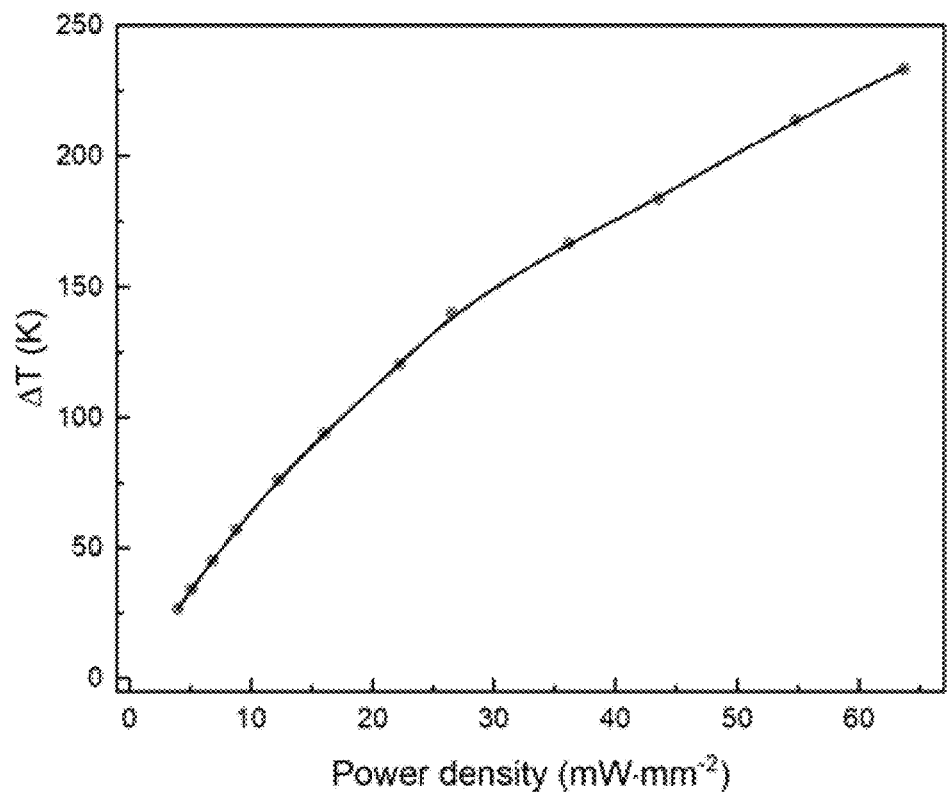
FIG. 9 is a change curve of a temperature rise of the carbon nanotube structure with a power density of the electron beam.
Figure 10:
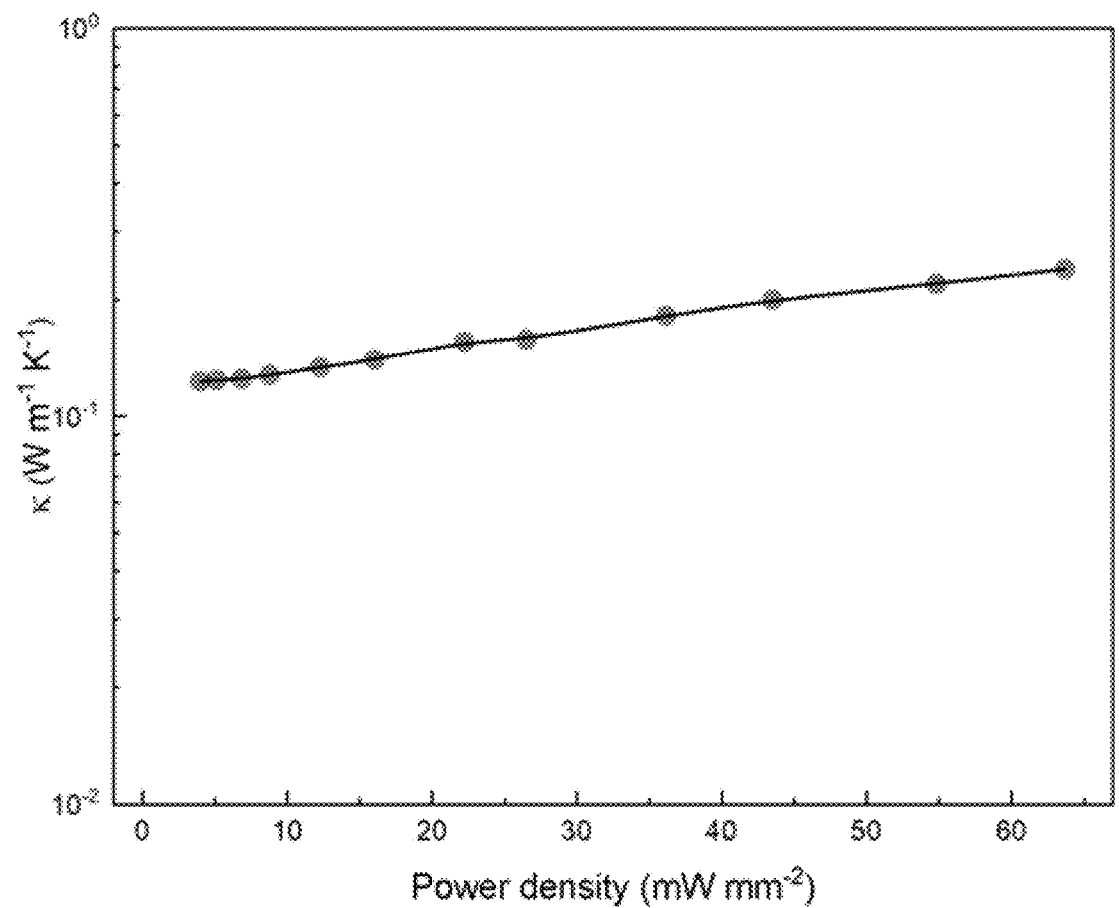
FIG. 10 is a change curve of a temperature rise sensitivity of the carbon nanotube structure with the power density of the electron beam.

FIG. 9 is a change curve of a temperature rise of the carbon nanotube structure 100 with a power density of the electron beam when the device 10 is used to detect electron beams with different power densities. It can be seen from FIG. 9 that the temperature rise of the carbon nanotube structure 100 changes substantially linearly with the increase of the power density of the electron beam. Referring to FIG. 10, at different power densities of the electron beam, a sensitivity of the carbon nanotube structure 100 changing with the power density of the electron beam remains substantially unchanged. FIG. 9 and FIG. 10 illustrate that a test sensitivity of the device 10 is substantially not affected by the power density of the energy beam. Therefore, the device 10 has high accuracy for high-energy beam detection.

Figure 11:
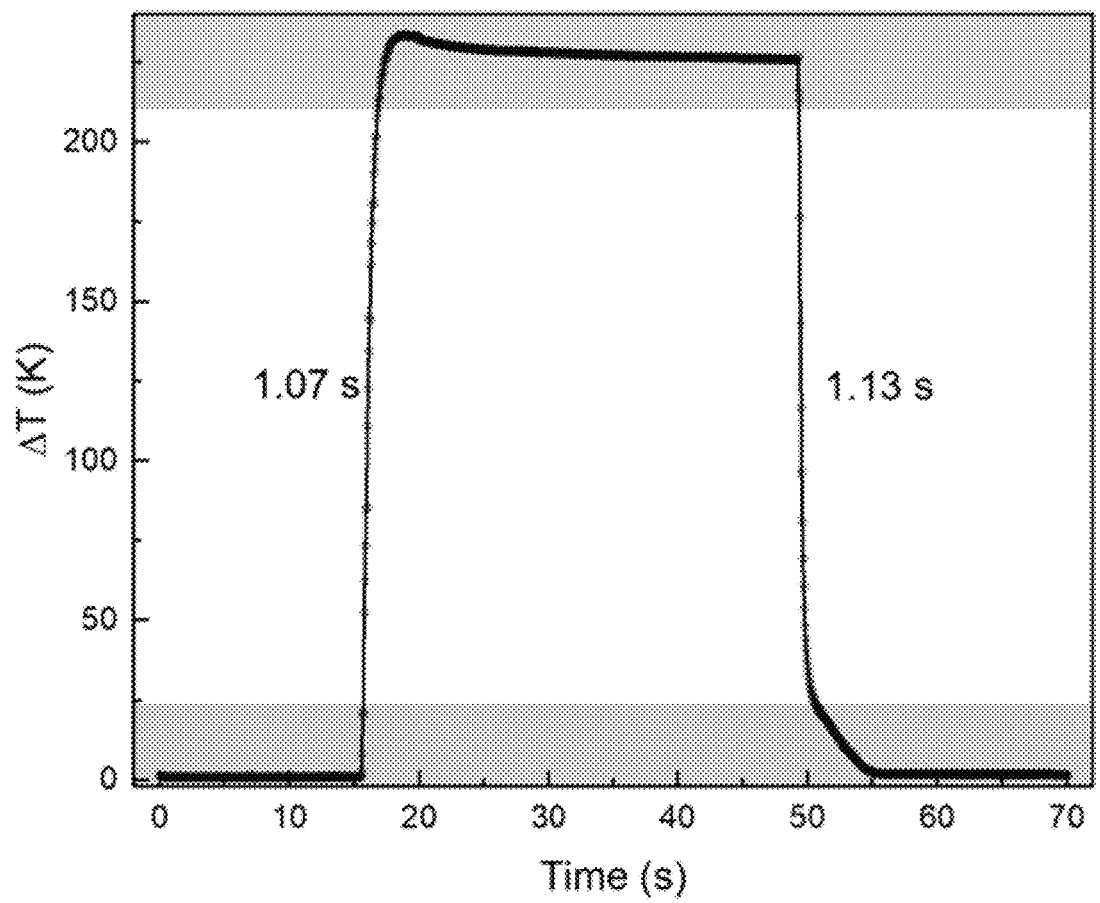
FIG. 11 is a change curve of the temperature rise of the carbon nanotube structure versus time when the device in FIG. 1 is used to detect an electron beam.

FIG. 11 is a curve of the temperature rise of the carbon nanotube structure 100 versus time when the device 10 is used to detect an electron beam. It can be seen from FIG. 11 that the carbon nanotube structure 100 rises from an initial temperature to the highest temperature instantaneously at 1.07 seconds, and keeps it at this temperature for 35 seconds, and then drops to the initial temperature instantaneously at 1.13 seconds. FIG. 11 shows that the carbon nanotube structure 100 has a fast response rate to the electron beam. Moreover, due to the low thermal conductivity of carbon nanotubes in the lateral direction, the heat generated by the electron beam takes a long time to disperse in the entire carbon nanotube structure 100. Therefore, the device 10 has high detection accuracy for the energy beam.

Figure 12:
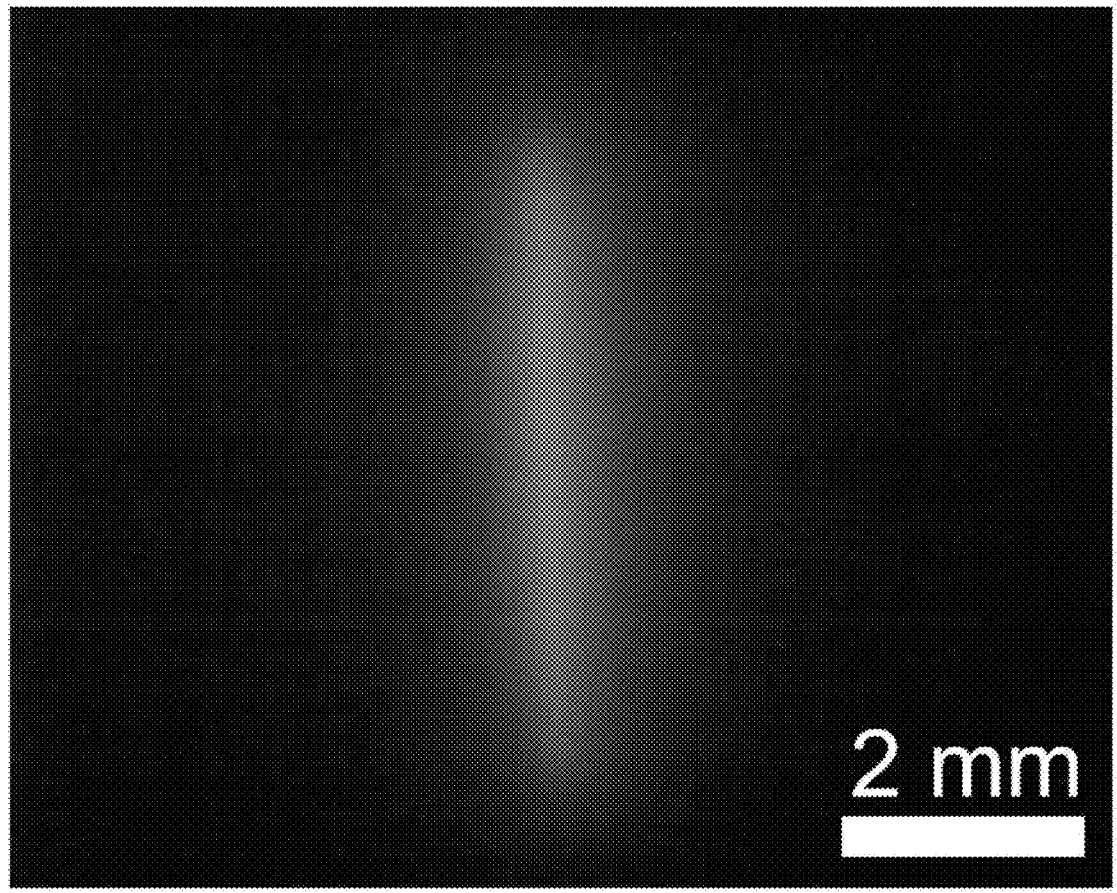
FIG. 12 is an image obtained by the infrared detector in FIG. 6 when the device in FIG. 1 is used to detect an electron beam.
Figure 13:
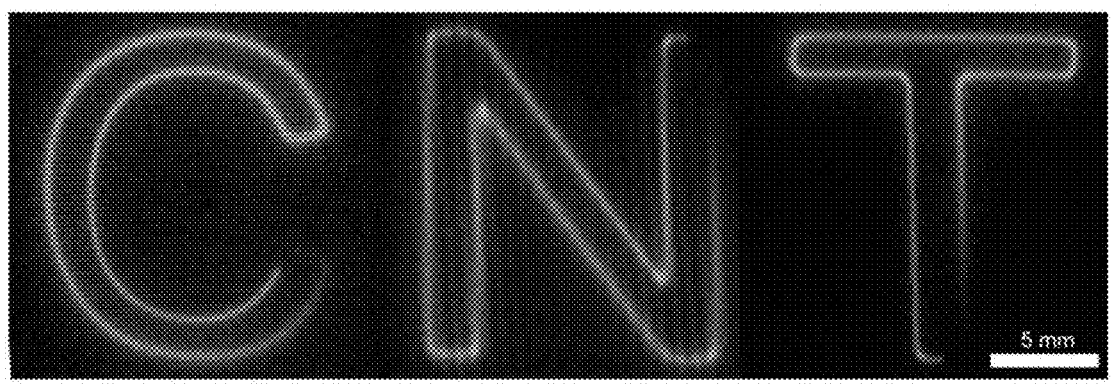
FIG. 13 is an image obtained by the infrared detector in FIG. 6 when the device in FIG. 1 is used to detect a laser beam.

FIG. 12 is an image obtained by the infrared detector 300 when the device 10 is used to detect an electron beam. It can be seen that a movement trajectory in the image matches an actual movement trajectory of the electron beam. FIG. 13 is an image obtained by the infrared detector 300 when the device 10 is used to detect a laser beam. It can be seen that a movement trajectory in the image matches an actual movement trajectory of the laser beam. FIG. 12 and FIG. 13 illustrate that when the device 10 is used to detect the movement trajectory of the energy beam, the detection accuracy is relatively high.

The device for detecting energy beam provided by the present invention only adopts the carbon nanotube structure and the infrared detector to realize the detection of the energy beam, and thus the device for detecting energy beam has a simple structure and low cost. The extending direction of the carbon nanotubes of the carbon nanotube structure is parallel to the direction of the energy beam. Since the thermal conductivity of carbon nanotubes in the transverse direction is very poor, when the energy beam irradiates on the carbon nanotube structure, the heat generated by the energy beam dissipates very slowly in the carbon nanotube structure. The temperature of the part of the carbon nanotube structure that is irradiated by the energy beam increases, and the temperature of the part that is not irradiated by the energy beam is substantially unchanged. Therefore, the infrared detector can obtain the beam spot size of the energy beam according to the temperature change in the carbon nanotube structure. When the energy beam moves above the carbon nanotube structure, the infrared detector can also obtain the movement trajectory of the energy beam according to the temperature change in the carbon nanotube structure, the detection method is simple and the detection accuracy is high. Since the thermal conductivity of carbon nanotubes in the transverse direction is about 0.1~0.2 $Wm^{-1}K^{-1}$, when the device is used to detect high energy beams, the device is not easy to be burnt out, and the energy beam does not scatter at the edge of the carbon nanotube structure. Therefore, the device for detecting energy beam can accurately detect high energy. The thermal conductivity of carbon nanotubes in the axial direction is large, since the carbon nanotube structure is suspended on the surface of the support structure, the heat of the carbon nanotube structure in the axial direction can be instantly transferred to the air and dispersed. Therefore, the thermal conductivity of carbon nanotubes in the axial direction does not affect the heat conduction of the carbon nanotubes in the transverse direction, and further improve the detection accuracy of the device.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure. Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A device for detecting energy beam comprising:
    a carbon nanotube structure comprising a plurality of carbon nanotubes, wherein an extending direction of each carbon nanotube of the plurality of carbon nanotubes is substantially parallel to each other;
    a support structure supporting the carbon nanotube structure, wherein a portion of the carbon nanotube structure is suspended between the support structure, and the extending direction of each carbon nanotube is substantially perpendicular to the substrate structure; and
    an infrared detector on one side of a suspended portion of the carbon nanotube structure and spaced apart from the carbon nanotube structure, wherein the infrared detector is configured to detect a temperature of the suspended portion of the carbon nanotube structure, to obtain a temperature distribution of the carbon nanotube structure, and produce an image according to the temperature distribution of the carbon nanotube structure.

2. The device of claim 1, wherein the carbon nanotube structure is a carbon nanotube array.

3. The device of claim 1, wherein the carbon nanotube structure comprises a plurality of carbon nanotube arrays stacked with each other.

4. The device of claim 1, wherein the plurality of carbon nanotubes are staggered arranged in a direction parallel to the extending direction of each carbon nanotube of the plurality of carbon nanotubes.

5. The device of claim 1, wherein the carbon nanotube structure is a super-aligned carbon nanotube array or a plurality of super-aligned carbon nanotube arrays stacked with each other.

6. The device of claim 1, wherein a thickness of the carbon nanotube structure in the extending direction ranges from 200 micrometers to 400 micrometers.

7. The device of claim 1, wherein the carbon nanotube structure is supported by the support structure at edge points of the carbon nanotube structure.

8. The device of claim 7, wherein the support structure is a hollow frame, or a plurality of columns arranged at intervals.

9. The device of claim 1, wherein a material of the support structure is a heat insulating material.

10. The device of claim 1, wherein the infrared detector comprises:
    an infrared probe detecting an infrared heat radiation and convert the detected infrared heat radiation into electrical signals;
    a signal processor processing the electrical signals to form an image; and
    an image display displaying the image.

11. The device of claim 10, wherein the infrared detector is an infrared thermal imager.

12. The device of claim 1, wherein the energy beam is an electron beam or a light beam.

13. A method for detecting energy beam comprising:
    step S1, providing a device for detecting energy beam comprising:
        a carbon nanotube structure comprising a plurality of carbon nanotubes, wherein an extending direction of each carbon nanotube of the plurality of carbon nanotubes is substantially parallel to each other;
        a support structure supporting the carbon nanotube structure, wherein a portion of the carbon nanotube structure is suspended between the support structure, and the extending direction of each carbon nanotube is substantially perpendicular to the substrate; and
        an infrared detector on one side of the suspended portion of the carbon nanotube and spaced apart from the carbon nanotube structure, wherein the infrared detector is configured to detect a temperature of the suspended portion of the carbon nanotube structure, to obtain a temperature distribution of the carbon nanotube structure, and produce an image according to the temperature distribution of the carbon nanotube structure;
    step S2, placing the suspended portion of the carbon nanotube structure on a projectile of an energy beam; and
    step S3, producing an image of a temperature distribution of the carbon nanotube structure, thereby obtaining an image or a movement track of beam spots of the energy beam projected on the device.

14. The method of claim 13, wherein the carbon nanotube structure is a super-aligned carbon nanotube array or comprises a plurality of super-aligned carbon nanotube arrays stacked with each other.

15. The method of claim 13, wherein a thickness of the carbon nanotube structure in the extending direction ranges from 200 micrometers to 400 micrometers.

16. The method of claim 13, wherein the carbon nanotube structure is supported by the support structure at edge points of the carbon nanotube structure.

17. The method of claim 13, wherein a material of the support structure is a heat insulating material.

18. The method of claim 13, wherein the infrared detector comprises:
    an infrared probe detecting an infrared heat radiation and convert the detected infrared heat radiation into electrical signals;
    a signal processor processing the electrical signals to form an image; and
    an image display displaying the image.

19. The method of claim 13, wherein the infrared detector is an infrared thermal imager.

* * * * *